(12) United States Patent
Kandasamy

(10) Patent No.: US 9,511,445 B2
(45) Date of Patent: Dec. 6, 2016

(54) SOLID STATE JOINING USING ADDITIVE FRICTION STIR PROCESSING

(71) Applicant: Aeroprobe Corporation, Christiansburg, VA (US)

(72) Inventor: Kumar Kandasamy, Blacksburg, VA (US)

(73) Assignee: Aeroprobe Corporation, Christiansburg, VA (US)

( * ) Notice: Subject to any disclaimer, the term of this patent is extended or adjusted under 35 U.S.C. 154(b) by 0 days.

(21) Appl. No.: 14/640,077

(22) Filed: Mar. 6, 2015

(65) Prior Publication Data
US 2016/0175981 A1 Jun. 23, 2016

Related U.S. Application Data

(63) Continuation-in-part of application No. 14/573,430, filed on Dec. 17, 2014.

(51) Int. Cl.
*B23K 20/12* (2006.01)
*B23K 20/227* (2006.01)
(Continued)

(52) U.S. Cl.
CPC ....... *B23K 20/1215* (2013.01); *B23K 20/1205* (2013.01); *B23K 20/128* (2013.01);
(Continued)

(58) Field of Classification Search
None
See application file for complete search history.

(56) References Cited

U.S. PATENT DOCUMENTS 3,217,957 A 11/1965 Jarvie et al.
3,279,971 A 10/1966 Gardener
(Continued)

FOREIGN PATENT DOCUMENTS

CN 102120287 7/2013
CN 102120287 B 7/2013
(Continued)

OTHER PUBLICATIONS

Co-Pending U.S. Appl. No. 14/954,104, filed Nov. 30, 2015.
(Continued)

*Primary Examiner* — Kiley Stoner
(74) *Attorney, Agent, or Firm* — New River Valley IP Law, P.C.; Michele L. Mayberry

(57) ABSTRACT

Additive friction stir methods for joining materials are provided. The methods comprise providing first and second substrates to be joined; providing a forming plate comprising one or more forming cavities; placing the first and second substrates in communication with the forming plate; placing the first and second substrates in communication with each other; rotating and translating an additive friction-stir tool relative to the substrates; feeding a filler material through the additive friction-stir tool; deforming the filler material and the first and second substrates; and extruding one or more of the filler material and the first and second substrates into one or more of the forming cavities of the forming plate. Interaction of the friction-stir tool with the substrates generates plastic deformation at the joint to weld the substrates at the joint. The methods include introduction of reinforcing material at the joint through addition of the filler material.

27 Claims, 10 Drawing Sheets

(51) Int. Cl.
*B23K 20/233* (2006.01)
*B33Y 10/00* (2015.01)

(52) U.S. Cl.
CPC ........ *B23K 20/129* (2013.01); *B23K 20/1245* (2013.01); *B23K 20/1295* (2013.01); *B23K 20/2275* (2013.01); *B23K 20/2333* (2013.01); *B23K 20/2336* (2013.01); *B23K 2203/02* (2013.01); *B23K 2203/04* (2013.01); *B23K 2203/08* (2013.01); *B23K 2203/10* (2013.01); *B23K 2203/12* (2013.01); *B23K 2203/14* (2013.01); *B23K 2203/15* (2015.10); *B23K 2203/18* (2013.01); *B23K 2203/20* (2013.01); *B23K 2203/22* (2013.01); *B23K 2203/24* (2013.01); *B23K 2203/26* (2015.10); *B33Y 10/00* (2014.12)

(56) References Cited

U.S. PATENT DOCUMENTS

| | | | |
|---|---|---|---|
| 3,292,838 A | 12/1966 | Farley | |
| 3,418,196 A | 12/1968 | Luc | |
| 3,444,611 A | 5/1969 | Bogart | |
| 3,455,015 A | 7/1969 | Daniels et al. | |
| 3,466,737 A | 9/1969 | Hanink | |
| 3,495,321 A | 2/1970 | Shaff | |
| 3,537,172 A | 11/1970 | Voznesensky et al. | |
| 3,831,262 A | 8/1974 | Luc | |
| 3,899,377 A | 8/1975 | Luc | |
| 3,949,896 A | 4/1976 | Luc | |
| 4,023,613 A | 5/1977 | Uebayasi et al. | |
| 4,106,167 A | 8/1978 | Luc | |
| 4,144,110 A | 3/1979 | Luc | |
| 4,491,001 A | 1/1985 | Yoshida et al. | |
| 4,625,095 A | 11/1986 | Das | |
| 4,824,295 A | 4/1989 | Sharpless | |
| 4,930,675 A | 6/1990 | Bedford et al. | |
| 4,959,241 A | 9/1990 | Thomas et al. | |
| 5,056,971 A | 10/1991 | Sartori | |
| 5,249,778 A | 10/1993 | Steichert et al. | |
| 5,262,123 A | 11/1993 | Thomas et al. | |
| 5,330,160 A | 7/1994 | Eisermann et al. | |
| 5,460,317 A | 10/1995 | Thomas et al. | |
| 5,469,617 A | 11/1995 | Thomas et al. | |
| 5,611,479 A | 3/1997 | Rosen | |
| 5,637,836 A | 6/1997 | Nakagawa et al. | |
| 5,697,511 A | 12/1997 | Bampton | |
| 5,697,544 A | 12/1997 | Wykes | |
| 5,713,507 A | 2/1998 | Holt et al. | |
| 5,718,366 A | 2/1998 | Colligan | |
| 5,769,306 A | 6/1998 | Colligan | |
| 5,794,835 A | 8/1998 | Colligan et al. | |
| 5,813,592 A | 9/1998 | Midling et al. | |
| 5,826,664 A | 10/1998 | Richardson | |
| 5,893,507 A | 4/1999 | Ding et al. | |
| 5,971,247 A | 10/1999 | Gentry | |
| 5,971,252 A | 10/1999 | Rosen et al. | |
| 5,975,406 A * | 11/1999 | Mahoney ............ | B23K 20/1265 228/112.1 |
| 6,021,821 A * | 2/2000 | Wegman ............... | B65B 1/12 141/129 |
| 6,024,141 A * | 2/2000 | Wegman ............... | B65B 1/12 141/129 |
| 6,029,879 A | 2/2000 | Cocks | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,119,624 A | 9/2000 | Morikawa et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,199,745 B1 | 3/2001 | Campbell et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,237,829 B1 | 5/2001 | Aota et al. | |
| 6,237,835 B1 | 5/2001 | Litwinski et al. | |
| 6,247,633 B1 | 6/2001 | White et al. | |
| 6,247,634 B1 | 6/2001 | Whitehouse | |
| 6,250,037 B1 | 6/2001 | Ezumi et al. | |
| 6,257,479 B1 | 7/2001 | Litwinski et al. | |
| 6,259,052 B1 | 7/2001 | Ding et al. | |
| 6,264,088 B1 | 7/2001 | Larsson | |
| 6,273,323 B1 | 8/2001 | Ezumi et al. | |
| 6,276,591 B1 | 8/2001 | Kawasaki et al. | |
| 6,290,117 B1 | 9/2001 | Kawasaki et al. | |
| 6,299,048 B1 | 10/2001 | Larsson | |
| 6,299,050 B1 | 10/2001 | Okamura et al. | |
| 6,302,315 B1 | 10/2001 | Thompson | |
| 6,305,866 B1 | 10/2001 | Aota et al. | |
| 6,311,889 B1 | 11/2001 | Ezumi et al. | |
| 6,315,187 B1 | 11/2001 | Satou et al. | |
| 6,321,975 B1 | 11/2001 | Kawasaki et al. | |
| 6,325,273 B1 | 12/2001 | Boon et al. | |
| 6,325,274 B2 | 12/2001 | Ezumi et al. | |
| 6,328,261 B1 * | 12/2001 | Wollaston ............ | B23K 20/122 228/112.1 |
| 6,352,193 B1 | 3/2002 | Bellino et al. | |
| 6,354,483 B1 | 3/2002 | Ezumi et al. | |
| 6,360,937 B1 | 3/2002 | De Koning | |
| 6,364,197 B1 | 4/2002 | Oelgoetz et al. | |
| 6,367,681 B1 | 4/2002 | Waldron et al. | |
| 6,378,264 B1 | 4/2002 | Kawasaki et al. | |
| 6,378,754 B2 | 4/2002 | Aota et al. | |
| 6,382,498 B2 | 5/2002 | Aota et al. | |
| 6,386,425 B2 | 5/2002 | Kawasaki et al. | |
| 6,398,883 B1 | 6/2002 | Forrest et al. | |
| 6,413,610 B1 | 7/2002 | Nakamura et al. | |
| 6,419,142 B1 | 7/2002 | Larsson | |
| 6,419,144 B2 | 7/2002 | Aota | |
| 6,421,578 B1 | 7/2002 | Adams et al. | |
| 6,422,449 B1 | 7/2002 | Ezumi et al. | |
| 6,450,394 B1 | 9/2002 | Wollaston et al. | |
| 6,450,395 B1 | 9/2002 | Weeks et al. | |
| 6,457,629 B1 | 10/2002 | White | |
| 6,460,752 B1 | 10/2002 | Waldron et al. | |
| 6,461,072 B2 | 10/2002 | Kawasaki et al. | |
| 6,464,127 B2 | 10/2002 | Litwinski et al. | |
| 6,468,067 B1 * | 10/2002 | Ikegami ................ | B29C 47/367 366/77 |
| 6,471,112 B2 | 10/2002 | Satou et al. | |
| 6,474,533 B1 | 11/2002 | Ezumi et al. | |
| 6,484,924 B1 | 11/2002 | Forrest | |
| 6,494,011 B2 | 12/2002 | Ezumi et al. | |
| 6,497,355 B1 | 12/2002 | Ding et al. | |
| 6,499,649 B2 | 12/2002 | Sayama et al. | |
| 6,502,739 B2 | 1/2003 | Ezumi et al. | |
| 6,513,698 B2 | 2/2003 | Ezumi et al. | |
| 6,516,992 B1 | 2/2003 | Colligan | |
| 6,527,470 B2 | 3/2003 | Ezumi et al. | |
| 6,536,651 B2 | 3/2003 | Ezumi et al. | |
| 6,543,671 B2 * | 4/2003 | Hatten ................. | B23K 20/128 228/112.1 |
| 6,572,007 B1 * | 6/2003 | Stevenson ............ | B23K 20/128 228/112.1 |
| 6,582,832 B2 | 6/2003 | Kawasaki et al. | |
| 6,599,641 B1 | 7/2003 | Nakamura et al. | |
| 6,648,206 B2 | 11/2003 | Nelson et al. | |
| 6,669,075 B2 | 12/2003 | Colligan | |
| 6,676,004 B1 | 1/2004 | Trapp et al. | |
| 6,722,556 B2 | 4/2004 | Schilling et al. | |
| 6,732,901 B2 | 5/2004 | Nelson et al. | |
| 6,745,929 B1 | 6/2004 | Ezumi et al. | |
| 6,758,382 B1 | 7/2004 | Carter | |
| 6,779,704 B2 | 8/2004 | Nelson et al. | |
| 6,811,632 B2 | 11/2004 | Nelson et al. | |

(56) References Cited

U.S. PATENT DOCUMENTS

| | | | |
|---|---|---|---|
| 6,866,181 B2 | 3/2005 | Aota et al. | |
| 6,908,690 B2 | 6/2005 | Waldron et al. | |
| 6,953,140 B2 | 10/2005 | Park et al. | |
| 7,036,708 B2 | 5/2006 | Park et al. | |
| 7,066,375 B2 | 6/2006 | Bolser | |
| 7,115,324 B1* | 10/2006 | Stol | B23K 9/02 428/157 |
| 7,124,929 B2 | 10/2006 | Nelson et al. | |
| 7,152,776 B2 | 12/2006 | Nelson et al. | |
| 7,156,276 B2 | 1/2007 | Slattery | |
| 7,163,136 B2 | 1/2007 | Hempstead | |
| 7,240,821 B2 | 7/2007 | Talwar | |
| 7,597,236 B2 | 10/2009 | Tolle et al. | |
| 7,608,296 B2 | 10/2009 | Packer et al. | |
| 7,624,910 B2 | 12/2009 | Barnes et al. | |
| 7,661,572 B2 | 2/2010 | Nelson et al. | |
| 7,732,033 B2 | 6/2010 | Aken et al. | |
| 7,918,379 B2* | 4/2011 | Fujii | B23K 9/173 228/112.1 |
| 7,971,770 B2 | 7/2011 | Nakagawa et al. | |
| 7,992,759 B2 | 8/2011 | Steel et al. | |
| 8,052,034 B2* | 11/2011 | Fleming | B23K 20/123 228/103 |
| 8,061,579 B2 | 11/2011 | Feng et al. | |
| 8,100,316 B2 | 1/2012 | Groehlich et al. | |
| 8,220,693 B2 | 7/2012 | Krajewski et al. | |
| 8,397,974 B2 | 3/2013 | Schultz et al. | |
| 8,464,926 B2 | 6/2013 | Kou et al. | |
| 8,479,970 B2* | 7/2013 | Ishibashi | B23K 20/1265 228/112.1 |
| 8,632,850 B2 | 1/2014 | Schultz et al. | |
| 8,636,194 B2 | 1/2014 | Schultz et al. | |
| 8,678,268 B1* | 3/2014 | Obadtich | B23K 20/126 228/112.1 |
| 8,714,431 B2 | 5/2014 | Roos et al. | |
| 8,875,976 B2 | 11/2014 | Schultz et al. | |
| 8,893,954 B2 | 11/2014 | Schultz et al. | |
| 9,205,578 B2 | 12/2015 | Schultz et al. | |
| 9,266,191 B2 | 2/2016 | Kandasamy et al. | |
| 2001/0011674 A1* | 8/2001 | Ezumi | B23K 20/122 228/112.1 |
| 2002/0011509 A1 | 1/2002 | Nelson et al. | |
| 2002/0014516 A1 | 2/2002 | Nelson et al. | |
| 2002/0168466 A1 | 11/2002 | Tapphorn et al. | |
| 2002/0179682 A1* | 12/2002 | Schilling | B23K 20/1245 228/112.1 |
| 2003/0010805 A1 | 1/2003 | Nelson et al. | |
| 2003/0042292 A1 | 3/2003 | Hatten et al. | |
| 2003/0075584 A1* | 4/2003 | Sarik | B23K 20/122 228/2.1 |
| 2003/0098336 A1 | 5/2003 | Yamashita | |
| 2003/0111147 A1* | 6/2003 | Keener | B21C 23/001 148/671 |
| 2003/0111514 A1 | 6/2003 | Miyanagi et al. | |
| 2003/0192941 A1* | 10/2003 | Ishida | B23K 20/123 228/112.1 |
| 2003/0218052 A2* | 11/2003 | Litwinski | B23K 20/1275 228/112.1 |
| 2004/0003911 A1 | 1/2004 | Vining et al. | |
| 2004/0055349 A1* | 3/2004 | El-Soudani | B21D 26/08 72/56 |
| 2004/0057782 A1* | 3/2004 | Okamoto | B21K 25/005 403/271 |
| 2004/0118899 A1 | 6/2004 | Aota et al. | |
| 2004/0134972 A1 | 7/2004 | Nelson et al. | |
| 2004/0149807 A1* | 8/2004 | Schilling | B21K 25/005 228/112.1 |
| 2004/0155093 A1 | 8/2004 | Nelson et al. | |
| 2004/0195291 A1 | 10/2004 | Andersson et al. | |
| 2004/0265503 A1 | 12/2004 | Clayton et al. | |
| 2005/0006439 A1 | 1/2005 | Packer et al. | |
| 2005/0045694 A1* | 3/2005 | Subramanian | B23K 20/122 228/112.1 |
| 2005/0045695 A1 | 3/2005 | Subramanian et al. | |
| 2005/0051599 A1 | 3/2005 | Park et al. | |
| 2005/0060888 A1 | 3/2005 | Park et al. | |
| 2005/0121497 A1 | 6/2005 | Fuller et al. | |
| 2005/0127139 A1 | 6/2005 | Slattery et al. | |
| 2005/0210820 A1 | 9/2005 | Tanaka et al. | |
| 2005/0242158 A1 | 11/2005 | Bolser | |
| 2005/0247756 A1 | 11/2005 | Frazer et al. | |
| 2005/0254955 A1* | 11/2005 | Helder | B23K 20/122 416/233 |
| 2006/0016854 A1 | 1/2006 | Slattery | |
| 2006/0032891 A1 | 2/2006 | Flak et al. | |
| 2006/0043151 A1 | 3/2006 | Stol et al. | |
| 2006/0060635 A1 | 3/2006 | Slattery et al. | |
| 2006/0096740 A1 | 5/2006 | Zheng | |
| 2006/0208034 A1 | 9/2006 | Packer et al. | |
| 2006/0289603 A1* | 12/2006 | Zettler | B23K 20/123 228/2.1 |
| 2007/0040006 A1 | 2/2007 | Charles R. et al. | |
| 2007/0044406 A1* | 3/2007 | Van Aken | B23K 20/1225 52/459 |
| 2007/0075121 A1 | 4/2007 | Slattery | |
| 2007/0102492 A1 | 5/2007 | Nelson et al. | |
| 2007/0138236 A1 | 6/2007 | Agarwal et al. | |
| 2007/0187465 A1 | 8/2007 | Eyre et al. | |
| 2007/0215675 A1* | 9/2007 | Barnes | B23K 20/122 228/112.1 |
| 2007/0241164 A1 | 10/2007 | Barnes et al. | |
| 2007/0295781 A1 | 12/2007 | Hunt et al. | |
| 2007/0297935 A1* | 12/2007 | Langan | B23K 20/12 420/528 |
| 2008/0006678 A1 | 1/2008 | Packer et al. | |
| 2008/0023524 A1* | 1/2008 | Ohashi | B23K 20/1245 228/2.1 |
| 2008/0041921 A1* | 2/2008 | Creehan | B23K 20/1225 228/101 |
| 2008/0047222 A1* | 2/2008 | Barnes | B23K 20/1225 52/693 |
| 2008/0135405 A1* | 6/2008 | Hori | B23K 20/122 204/298.12 |
| 2009/0090700 A1* | 4/2009 | Sato | B23K 20/1225 219/117.1 |
| 2009/0152328 A1* | 6/2009 | Okamoto | B23K 20/126 228/112.1 |
| 2009/0188101 A1 | 7/2009 | Durandet et al. | |
| 2009/0236028 A1* | 9/2009 | Fukuda | B21J 5/063 156/73.5 |
| 2009/0236403 A1 | 9/2009 | Feng et al. | |
| 2009/0258232 A1 | 10/2009 | Brice | |
| 2010/0037998 A1* | 2/2010 | Bray | B64C 3/182 148/690 |
| 2010/0065611 A1* | 3/2010 | Fukuda | B23K 20/1265 228/56.3 |
| 2010/0068550 A1 | 3/2010 | Watson et al. | |
| 2010/0089976 A1 | 4/2010 | Szymanski et al. | |
| 2010/0089977 A1 | 4/2010 | Chen et al. | |
| 2010/0101768 A1* | 4/2010 | Seo | F28F 3/12 165/168 |
| 2010/0146866 A1 | 6/2010 | Nelson et al. | |
| 2010/0176182 A1* | 7/2010 | Hanlon | B23K 20/1245 228/2.1 |
| 2010/0252614 A1* | 10/2010 | Fujii | B23K 20/1225 228/112.1 |
| 2010/0258612 A1 | 10/2010 | Kolbeck et al. | |
| 2010/0282717 A1* | 11/2010 | Ananthanarayanan | B23K 11/115 219/108 |
| 2010/0284850 A1 | 11/2010 | Hawk | |
| 2010/0285207 A1 | 11/2010 | Creehan et al. | |
| 2010/0297469 A1 | 11/2010 | Aota et al. | |
| 2011/0062219 A1* | 3/2011 | Bezaire | B23K 20/129 228/114 |
| 2011/0132968 A1* | 6/2011 | Nakagawa | B23K 20/122 228/112.1 |
| 2011/0132970 A1* | 6/2011 | Nakagawa | B23K 20/122 228/112.1 |
| 2011/0227590 A1 | 9/2011 | Killian et al. | |
| 2011/0266330 A1* | 11/2011 | Bruck | B23K 20/128 228/112.1 |

(56) References Cited

U.S. PATENT DOCUMENTS

| | | | |
|---|---|---|---|
| 2012/0009339 A1* | 1/2012 | Creehan | B23K 20/1255 427/180 |
| 2012/0114897 A1* | 5/2012 | Thiagarajan | B29C 44/025 428/71 |
| 2012/0132342 A1* | 5/2012 | Kato | B23K 20/122 156/73.5 |
| 2012/0237788 A1 | 9/2012 | Fujii et al. | |
| 2012/0273113 A1 | 11/2012 | Hovanski et al. | |
| 2012/0279043 A1* | 11/2012 | Carter | B21D 39/031 29/525.05 |
| 2012/0279271 A1* | 11/2012 | Carter | H05B 6/101 72/342.8 |
| 2012/0279441 A1* | 11/2012 | Creehan | B23K 20/12 118/76 |
| 2012/0279442 A1* | 11/2012 | Creehan | B23K 20/1225 118/76 |
| 2012/0325894 A1 | 12/2012 | Chun et al. | |
| 2014/0061185 A1* | 3/2014 | Schindele | B23K 20/128 219/617 |
| 2014/0130736 A1 | 5/2014 | Schultz et al. | |
| 2014/0134325 A1 | 5/2014 | Schultz et al. | |
| 2014/0166731 A1* | 6/2014 | Seo | B23K 20/122 228/112.1 |
| 2014/0174344 A1 | 6/2014 | Schultz et al. | |
| 2015/0165546 A1 | 6/2015 | Kandasamy et al. | |
| 2016/0074958 A1 | 3/2016 | Kandasamy et al. | |
| 2016/0107262 A1 | 4/2016 | Schultz et al. | |

FOREIGN PATENT DOCUMENTS

| | | | | |
|---|---|---|---|---|
| CN | 203738226 | | 7/2014 | |
| CN | 203738226 U | * | 7/2014 | |
| EP | 0453182 A | | 10/1991 | |
| EP | 0458774 A | | 11/1991 | |
| EP | 0458774 A1 | | 11/1991 | |
| EP | 0410104 B1 | | 7/1993 | |
| EP | 0597335 A | | 5/1994 | |
| EP | 0597335 A1 | | 5/1994 | |
| EP | 1206995 A2 | | 5/2002 | |
| EP | 1543913 A2 | * | 6/2005 | B23K 20/123 |
| EP | 1790425 A1 | * | 5/2007 | B23K 20/1245 |
| EP | 1543913 B1 | | 8/2007 | |
| EP | 1790425 B1 | | 10/2011 | |
| EP | 2783976 A1 | | 10/2014 | |
| GB | 572789 A | | 10/1945 | |
| GB | 1224891 A | | 3/1971 | |
| GB | 2270864 A | | 3/1994 | |
| GB | 2306366 A | | 5/1997 | |
| JP | 10286682 | | 10/1998 | |
| JP | 10286682 A | * | 10/1998 | |
| JP | 11156561 | | 6/1999 | |
| JP | 11156561 A | * | 6/1999 | |
| JP | 11267857 | | 10/1999 | |
| JP | 2002153976 | | 5/2002 | |
| JP | 2002153976 A | * | 5/2002 | |
| JP | 2002192358 | | 7/2002 | |
| JP | 2002192358 A | * | 7/2002 | |
| JP | 2002256453 A | | 9/2002 | |
| JP | 2002283069 | | 10/2002 | |
| JP | 2002283069 A | * | 10/2002 | |
| JP | 2004025296 | | 1/2004 | |
| JP | 2004025296 A | * | 1/2004 | |
| JP | 2004261859 | | 9/2004 | |
| JP | 2004261859 A | * | 9/2004 | |
| JP | 2004298955 | | 10/2004 | |
| JP | 2004298955 A | * | 10/2004 | |
| JP | 2007222925 A | * | 9/2007 | |
| JP | 2007283317 | | 11/2007 | |
| JP | 2007283317 A | * | 11/2007 | |
| JP | 2008254047 | | 10/2008 | |
| JP | 2008254047 A | * | 10/2008 | |
| JP | 2011056582 A | * | 7/2010 | |
| JP | 2010279958 A | * | 12/2010 | |
| JP | 2011056582 | | 3/2011 | |
| JP | 2011056582 A | * | 3/2011 | |
| JP | 2013049091 | | 3/2013 | |
| JP | 2013049091 A | * | 3/2013 | |
| KR | 101256970 B1 | * | 4/2013 | |
| KR | 101278097 B1 | * | 6/2013 | |
| SU | 266539 A | | 11/1976 | |
| SU | 1393566 | | 5/1988 | |
| WO | 9310935 A1 | | 6/1993 | |
| WO | WO 0174525 A1 | * | 10/2001 | B23K 20/126 |
| WO | 2011137300 A2 | | 11/2011 | |
| WO | 2013002869 A2 | | 1/2013 | |
| WO | 2013095031 A1 | | 6/2013 | |
| WO | WO 2013095031 A1 | * | 6/2013 | B21C 25/00 |

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.
Co-pending Application No. PCT/US12/32793 filed Apr. 9, 2012 (published as WO2013/002869 on Jan. 3, 2013).
Co-Pending U.S. Appl. No. 14/573,430, filed Dec. 17, 2014.
Co-Pending U.S. Appl. No. 14/643,396, filed Mar. 10, 2015.
Davis, Jr, editor, Handbook of Thermal Spray Technology, ASM International (2004), pp. 138-139.
Friction Stir Tooling: Tool Materials and Designs, Chapter 2 in Friction Stir Welding and Processing, pp. 7-35, ASM International, Editors Rajiv S. Mishra & Murray W. Mahoney, 2007.
Geiger et al., "Friction stir knead welding of steel aluminum butt joints." International Journal of Machine Tools & Manufacture, vol. 48, pp. 515-521, 2008.
International Preliminary Report on Patentability of International Application No. PCT/US2012/032793, Oct. 8, 2013, 7 pages.
International Search Report and Written Opinion of International Application No. PCT/US2012/032793, Dec. 18, 2012.
Kallee et al., "Friction stir welding—invention, innovations and applications." INALCO 2001, 8th International Conference on Joints in Aluminium, Munich, Germany, 19 pages.
Metal-Matrix Composites (ASM Metals Handbook Online, ASM International, 2002), Introduction, Aluminum-Matrix Composites.
The American Welding Society. The Everyday Pocket Handbook on Welded Joint Details for Structural Applications. 2004.
Co-Pending U.S. Appl. No. 14/926,447, filed Oct. 29, 2015.

* cited by examiner

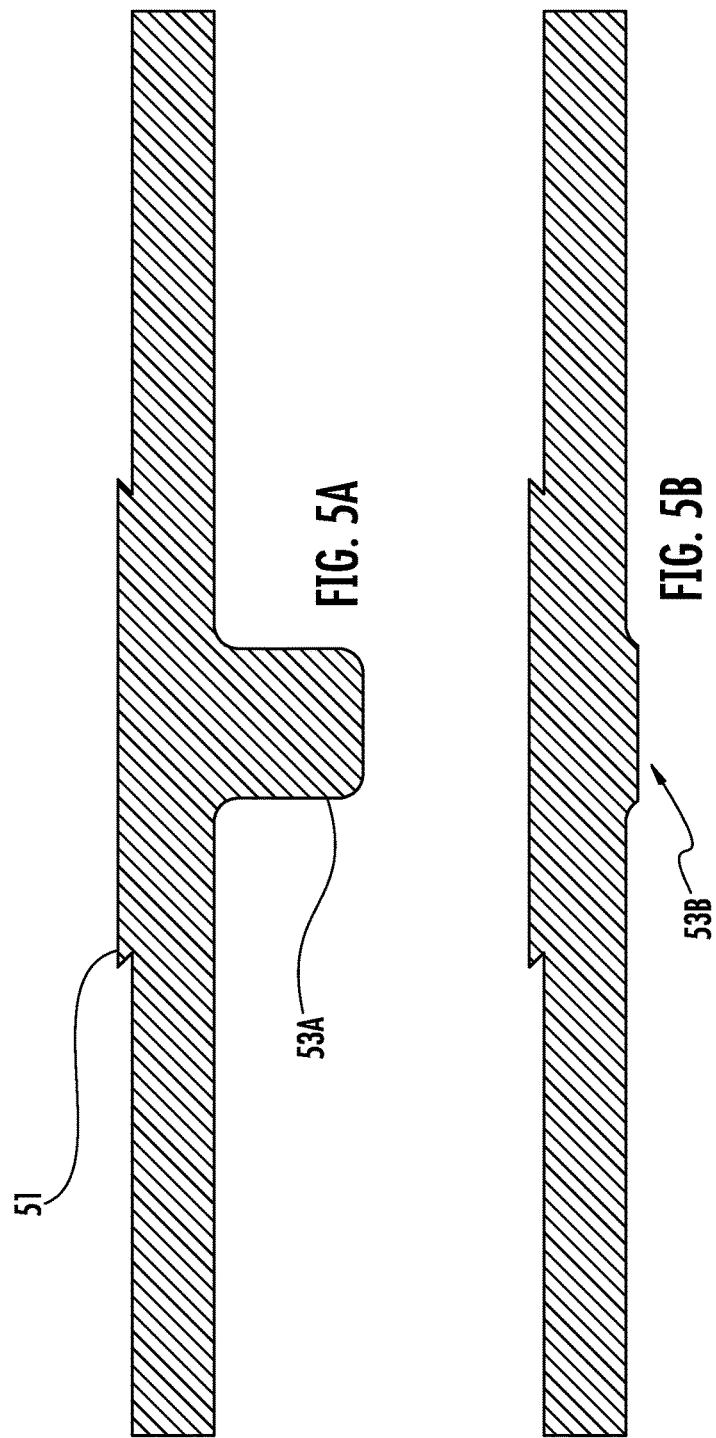

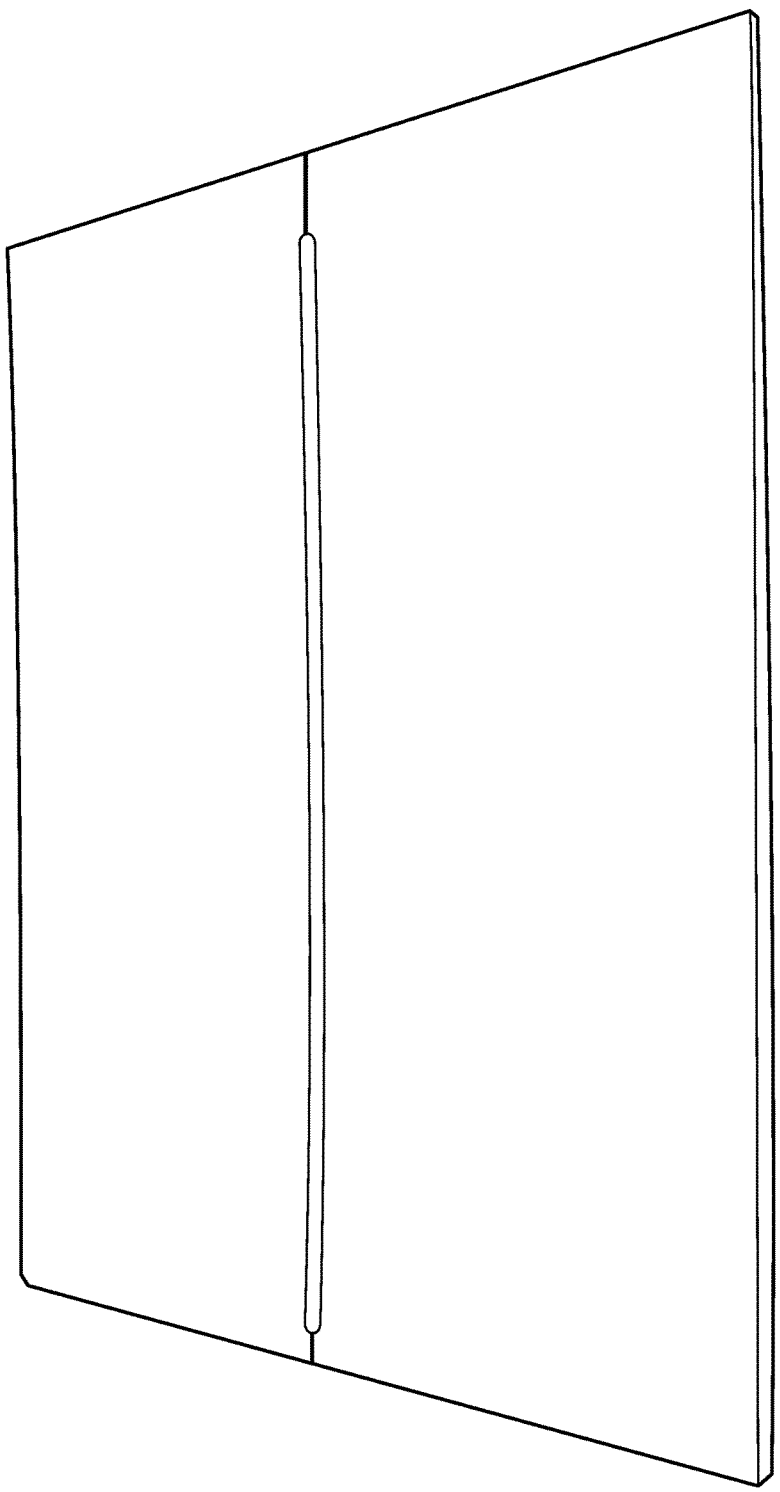

SOLID STATE JOINING USING ADDITIVE FRICTION STIR PROCESSING

CROSS-REFERENCE TO RELATED APPLICATIONS

The present application is a Continuation-in-Part (CIP) of U.S. patent application Ser. No. 14/573,430 filed Dec. 17, 2014, the disclosure of which is incorporated herein by reference in its entirety.

BACKGROUND OF THE INVENTION

1. Field of the Invention

The present invention is in the fields of solid state manufacturing, including material joining or welding and additive manufacturing. In particular, the invention is in the field of additive friction-stir joining of materials.

2. Description of Related Art

Friction-stir processing provides for the solid state joining of pieces of metal at a joint region through the generation of frictional heat at the joint and opposed portions of the metal pieces by cyclical movements of a tool piece that is harder than the metal pieces. An example of this is provided by International Application Publication No. PCT/GB1992/002203. Frictional heat produced between the substrate and the tool during the process causes the opposed portions of the substrate to soften, and mechanical intermixing and pressure cause the two materials to join. Typically, two materials are placed side-by-side and are joined together at the seam between the two.

Additive friction stir techniques employ an additive process for joining materials. See, for example, U.S. Pat. Nos. 8,636,194; 8,632,850; 8,875,976; and 8,397,974, the contents of which are hereby incorporated by reference in their entireties. Additive friction stir processes use shear-induced interfacial heating and plastic deformation to deposit metallic coatings onto metal substrates. Coatings prepared using additive friction stir techniques have bond strengths superior to those of thermally sprayed coatings, and have the potential to enhance corrosion resistance, enhance wear resistance, repair damaged or worn surfaces, and act as an interfacial layer for bonding metal matrix composites. In this process, the coating material, such as a metal alloy, is forced through a rotating spindle to the substrate surface. Frictional heating occurs at the filler/substrate interface due to the rotational motion of the filler material, such as a rod, at an angular velocity and the downward force applied. The mechanical shearing that occurs at the interface acts to disperse any oxides or boundary layers, resulting in a metallurgical bond between the substrate and coating. As the substrate moves relative to the tool, the coating is extruded under the rotating shoulder of the stirring tool.

Solid state joining processes that are currently available do not use additional filler material and typically require plunging of a profiled tool into the base metal. The plunging of the tool tends to cause considerable tool wear making it unusable and also introduces contaminates into the weld. This problem becomes more severe with materials having a high melting point such as steel, nickel-based alloys, cobalt-based alloys, titanium-based alloys and refractory metals. In addition, the manufacturing of profiled tools are very challenging, time consuming and costly. Thus, there is a need in the art for new solid state joining processes.

SUMMARY OF THE INVENTION

The present invention comprises methods, processes, or procedures for welding or joining materials of various kinds in solid state. Stiffening ribs and other reinforcement structures can be formed with the aid of forming plates. Due to the additive nature of the additive friction stir technology, the dimensions of the stiffening ribs can be limitless since the dimensions are only limited by the amount of filler material that is delivered during the process, which in some embodiments can be continuous and limitless. The forming plate design and the edge preparation of the materials being welded can be modified to control the geometry of the structures and the joint line with or without reinforcement.

Advantages of the invention include reduced tool wear and breakage resulting from the use of filler metal for penetrating and forming the base metal instead of the tool penetrating the workpiece(s). In addition, high melting point materials, alloys and particle/short fiber reinforced composite can be welded with already available tool materials. Further, the solid state nature of the process allows for using similar filler metal as base metal, which will reduce galvanic corrosion. Another potential benefit is achieving a weld quality that is insensitive to tool wear (especially where axial pressure is maintained). As a result of these advantages, the present invention is a viable, economic, and efficient alternative to conventional welding processes that can be used to weld or join a variety of high temperature materials with or without the help of external heating and assistance from resistance heating, gas torch heating, arc heating, ultrasonic vibrations, microwave heating and induction hearting and so on.

In embodiments of the invention, provided is an additive friction stir method for joining substrates, the method comprising: providing first and second substrates to be joined; providing a forming plate comprising one or more forming cavities; placing the first and second substrates in communication with the forming plate; placing the first and second substrates in communication with each other; rotating and translating an additive friction-stir tool relative to the substrates; feeding a filler material through the additive friction-stir tool; deforming the filler material and the first and second substrates; and extruding one or more of the filler material and the first and second substrates into one or more of the forming cavities of the forming plate.

According to embodiments, the first and second substrates can be a sheet of metal or a metal plate. Additionally or alternatively, the first and second substrates and the filler material are each metal independently chosen from steel, Al, Ni, Cr, Cu, Co, Au, Ag, Mg, Cd, Pb, Pt, Ti, Zn, or Fe, or an alloy comprising one or more of these metals. In embodiments, the filler material can be provided as a powder, pellet, rod, or powdered-filled cylinder.

In some methods of the invention, during rotating and translating of the friction-stir tool, the friction-stir tool penetrates the first and/or second substrate and in other methods the friction-stir tool does not penetrate the first and/or second substrates. To accomplish this, the friction-stir tool can have a pin or no pin disposed on an axis of rotation of the tool that is capable of penetrating the first and second substrates.

Optionally, the methods can comprise applying a shielding gas through the forming cavity during translating of the friction-stir tool.

Interaction of the filler material with the first and/or second substrates generates plastic deformation of the substrates and generates heat, and causes welding of the first and second substrates along a joint with the filler metal. In embodiments, the filler material is included in the joint.

Joining of the materials can be performed in numerous ways, including where the first and second substrates are in communication with each other along a face of each substrate. The substrates can be in communication with each other to provide for a butt joint, a lap joint, a corner joint, a Tee-joint, a flange, a flare, a mechanical weld, an angular weld, or an edge weld.

A method of creating a butt joint according to embodiments of the invention can include disposing a first face of each of the first and second substrates in communication with each other to provide for a butt joint between the first and second substrates; disposing a second face of each of the first and second substrates in communication with the forming plate; depositing the filler material on a third face of each of the first and second substrates, which third face is disposed in a direction opposite the second face; and extruding the filler material, the first substrate, or the second substrate to reinforce the butt joint along each second face of the substrates. In this embodiment, the extruding can be performed to create a rib in communication with each second face and in communication with the butt joint.

Butt joint embodiments can be formed by providing first and second substrates where the first face of each of the first and second substrates is slanted and when abutted together form an inverted V-shaped groove.

Particular methods include wherein the first substrate comprises a first face in communication with the forming plate; the first substrate comprises a second face disposed in a direction opposite the first face of the first substrate; the second substrate comprises a first face in communication with the second face of the first substrate such that the first substrate is sandwiched between the forming plate and the second substrate to provide for a lap joint between the first and second substrates; the second substrate comprises a second face disposed in a direction opposite the first face of the second substrate; the filler material is deposited on the second face of the second substrate and the deforming of the filler material and the first and second substrates creates the lap joint. The interaction of the filler material with the first and/or second substrates generates plastic deformation of and causes welding of the first and second substrates along the lap joint.

Other particular methods include an additive friction stir method for joining substrates in a corner joint configuration, the method comprising: providing first and second substrates to be joined; providing a forming plate comprising one or more forming cavities; placing the first and second substrates in communication with the forming plate; placing the first and second substrates in communication with each other to provide for a corner joint between the first and second substrates; rotating and translating an additive friction-stir tool relative to the substrates; feeding a filler material through the additive friction-stir tool; and deforming the filler material and the first and second substrates to create the corner joint.

Such methods can include where the first and second substrates each comprise a first face with a slanted surface; the first face of the first substrate is in communication with the first face of the second substrate to provide for a corner joint between the first and second substrates; the first and second substrates each comprise a second face in communication with the forming plate; the filler material is deposited on a third face of each of the first and second substrates, which third face is disposed in a direction opposite the second face; and the filler material reinforces the corner joint at a concave portion of the corner joint along the third face of the first and second substrates. Similarly with this embodiment, the interaction of the filler material with the first and/or second substrates generates plastic deformation of and causes welding of the first and second substrates along the corner joint. Further, it is important to note that the filler material can be included as part of the completed corner joint.

Other specific aspects of the invention can include an additive friction stir method for welding a joint, comprising providing a pair of opposed substrates at least one of which substrates is in communication with a forming plate configured to provide a forming cavity or groove, wherein the pair of opposed substrates meet at a joint disposed over the forming cavity or groove. The method further comprises translating a rotating non-consumable friction-stir tool along a vector that overlies the joint, and feeding the rotating non-consumable friction-stir tool with a consumable filler material such that interaction of the rotating non-consumable friction-stir tool with the opposed substrates generates plastic deformation at the joint, thereby welding the pair of opposed substrates at the joint. Plastic deformation at the joint includes consumable filler material which reinforces the joint.

Another aspect of the invention provides an additive friction stir method for forming a butt joint. The method comprises providing a pair of laterally opposed substrates each of which are in communication with a forming plate configured to hold the laterally opposed substrates in opposition and provide a forming cavity or groove, wherein the pair of laterally opposed substrates meet at a butt joint disposed over the forming cavity or groove. The method further comprises translating a rotating non-consumable friction-stir tool along a vector that overlies the butt joint, and feeding the rotating non-consumable friction-stir tool with a consumable filler material such that interaction of the rotating non-consumable friction-stir tool with the opposed substrates generates plastic deformation at the butt joint, thereby welding the pair of laterally opposed substrates at the butt joint. In this embodiment, plastic deformation at the butt joint includes consumable filler material which reinforces the butt joint.

In this aspect, the rotating non-consumable friction stir tool does not penetrate the laterally opposed substrates during translation. Further, the rotating non-consumable friction stir tool has no pin or projecting or profiled features capable of penetrating the laterally opposed substrates. The consumable filler material reinforces the welded butt joint along a first face perpendicular to the butt joint, wherein the first face is in communication with the rotating non-consumable friction stir tool during translation. Alternatively, or in addition, the consumable filler and a portion of the opposed substrates are extruded through the forming cavity or groove to reinforce the welded butt joint along a second face perpendicular to the butt joint, wherein the second face opposes the first face. Additionally, the consumable filler and a portion of the opposed substrates may be extruded through the forming groove to form a rib at the welded butt joint at a second face perpendicular to the butt joint, wherein the second face opposes the first face.

Another aspect of the invention provides an additive friction stir method for forming a lap joint. The method comprises providing a pair of vertically opposed substrates comprising a bottom substrate and a top substrate, the bottom substrate being in communication with the top substrate and a forming plate configured to hold the vertically opposed substrates in parallel and provide a forming cavity or groove under the bottom substrate. The method further comprises translating a rotating non-consumable friction-stir tool along the top substrate along a vector that overlies the forming cavity or groove, and feeding the rotating non-consumable friction-stir tool with a consumable filler material such that interaction of the rotating non-consumable friction-stir tool with the top substrate generates plastic deformation over the forming cavity or groove, thereby welding the pair of vertically opposed substrates at a lap joint. In this embodiment, plastic deformation at the lap joint includes consumable filler material which reinforces the lap joint.

In this aspect, the rotating non-consumable friction stir tool does not penetrate the top substrate during translation. Further, the rotating non-consumable friction stir tool has no pin or projecting or profiled features capable of penetrating the top substrate. The consumable filler reinforces the welded lap joint along the top substrate. Alternatively or in addition, the consumable filler and a portion of the opposed substrates are extruded through the forming cavity or groove to reinforce the welded lap joint along the bottom substrate. Additionally, the consumable filler and a portion of the opposed substrates may be extruded through the forming cavity or groove to form a rib at the bottom substrate.

Another aspect of the invention provides an additive friction stir method for forming a corner joint. The method comprises providing a pair of opposed substrates configured to meet at the ends at an acute angle to form a corner joint, wherein the pair of opposed substrates are in communication with a forming plate configured to hold the pair of opposed substrates at an angle and provide a forming cavity or groove underneath the corner joint. The method further comprises translating a rotating non-consumable friction-stir tool along the pair of opposed substrates along a vector that overlies the corner joint, and feeding the rotating non-consumable friction-stir tool with a consumable filler material such that interaction of the rotating non-consumable friction-stir tool with the pair of opposed substrates generates plastic deformation over the forming cavity or groove, thereby welding the pair of opposed substrates at the corner joint. In this embodiment, plastic deformation at the corner joint includes consumable filler material which reinforces the corner joint.

In this aspect, the rotating non-consumable friction stir tool does not penetrate the pair of opposed substrates during translation. Further, the rotating non-consumable friction stir tool has no pin or projecting or profiled features capable of penetrating the pair of opposed substrates. The consumable filler reinforces the welded corner joint at a concave portion of the corner joint. Alternatively or in addition, the consumable filler and a portion of the opposed substrates are extruded through the forming cavity or groove to reinforce the welded corner joint at a convex portion of the corner joint. Additionally, the consumable filler and a portion of the opposed substrates may be extruded through the forming cavity or groove to form a rib at a convex portion of the corner joint.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 5A is a schematic diagram showing welded plates with rib formation on the root according to an embodiment of the invention.

FIG. 5B is a schematic diagram showing welded plates with minimal rib formation on the root according to an embodiment of the invention.

FIGS. 8A-B are diagrams of a weld produced using an embodiment of the additive friction stir methods of the invention, where FIG. 8A shows one side of the substrates joined (face side) and FIG. 8B shows the other side facing in an opposing direction (root side).

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Solid state joining of materials can be classified into diffusion welding processes and deformation welding processes. Diffusion welding processes typically employ longer processing times, higher temperatures and less pressure, whereas deformation welding processes typically employ higher pressure, higher temperatures and shorter processing times. Deformation welding can be employed for various joint configurations. Additive friction stir is one of such deformation-based wrought metal deposition processes which can be utilized for joining materials. Since additive friction stir methods can add materials along the weld line, using a forming plate in the back of the weld allows a stiffening rib to be formed in addition to joining/welding.

From the materials perspective based on surface oxidation characteristics and melting point, each metal has a specific degree of deformation and temperature requirements for obtaining sound metallurgical bonding. For example, for ferrous metals the deformation requirement is about 81%, while aluminum alloys require 40-60%. The deformation helps in bringing two metallic surfaces together by breaking surface contaminations. The force required to deform the material decreases with temperature.

Figure 1:
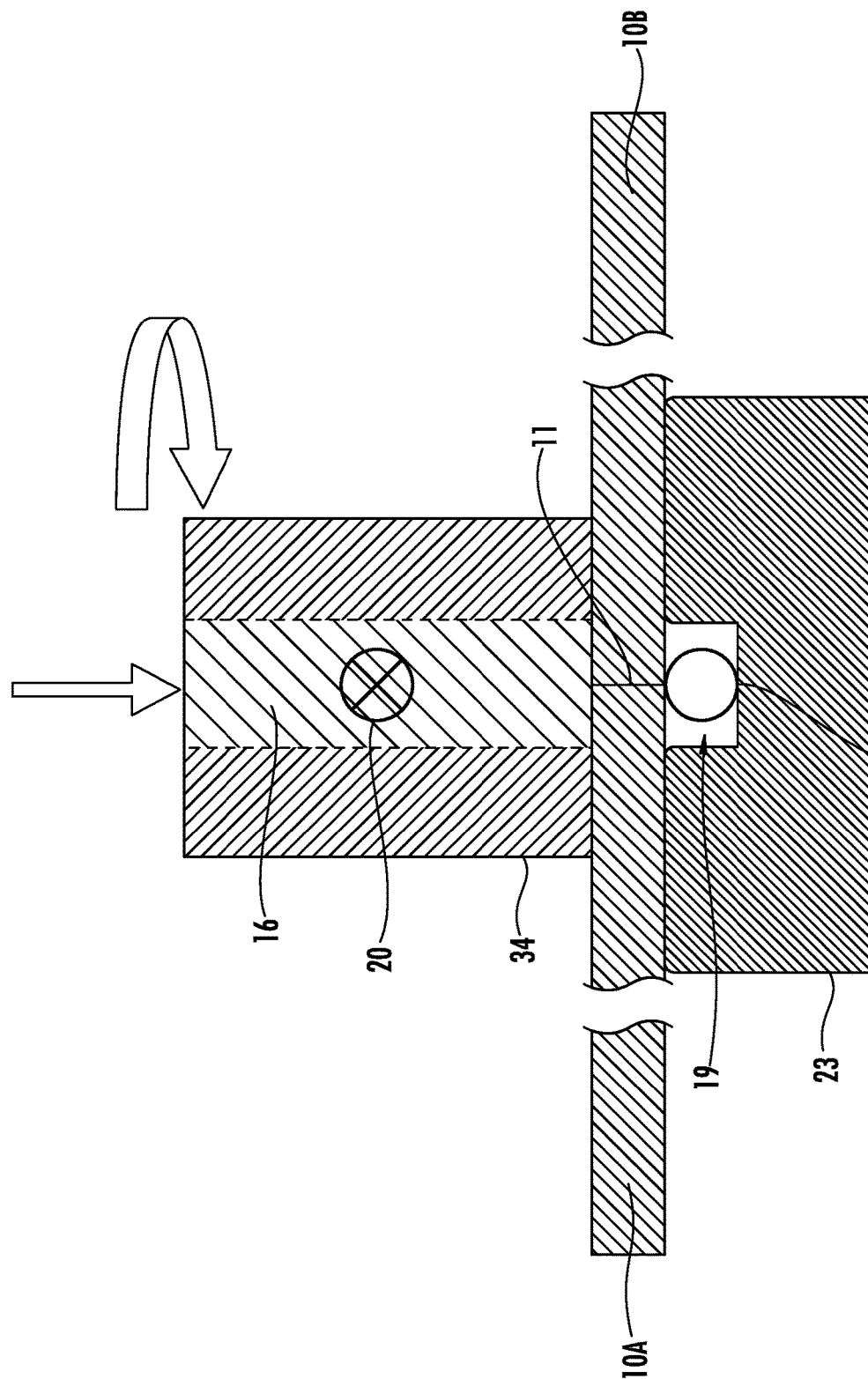
FIG. 1 is a schematic diagram showing a front cross-sectional view of a set up that can be used for welding/joining materials 10A and 10B at joint line 11, where optionally nozzles 45 for inert gas shielding can be used.
Figure 2:
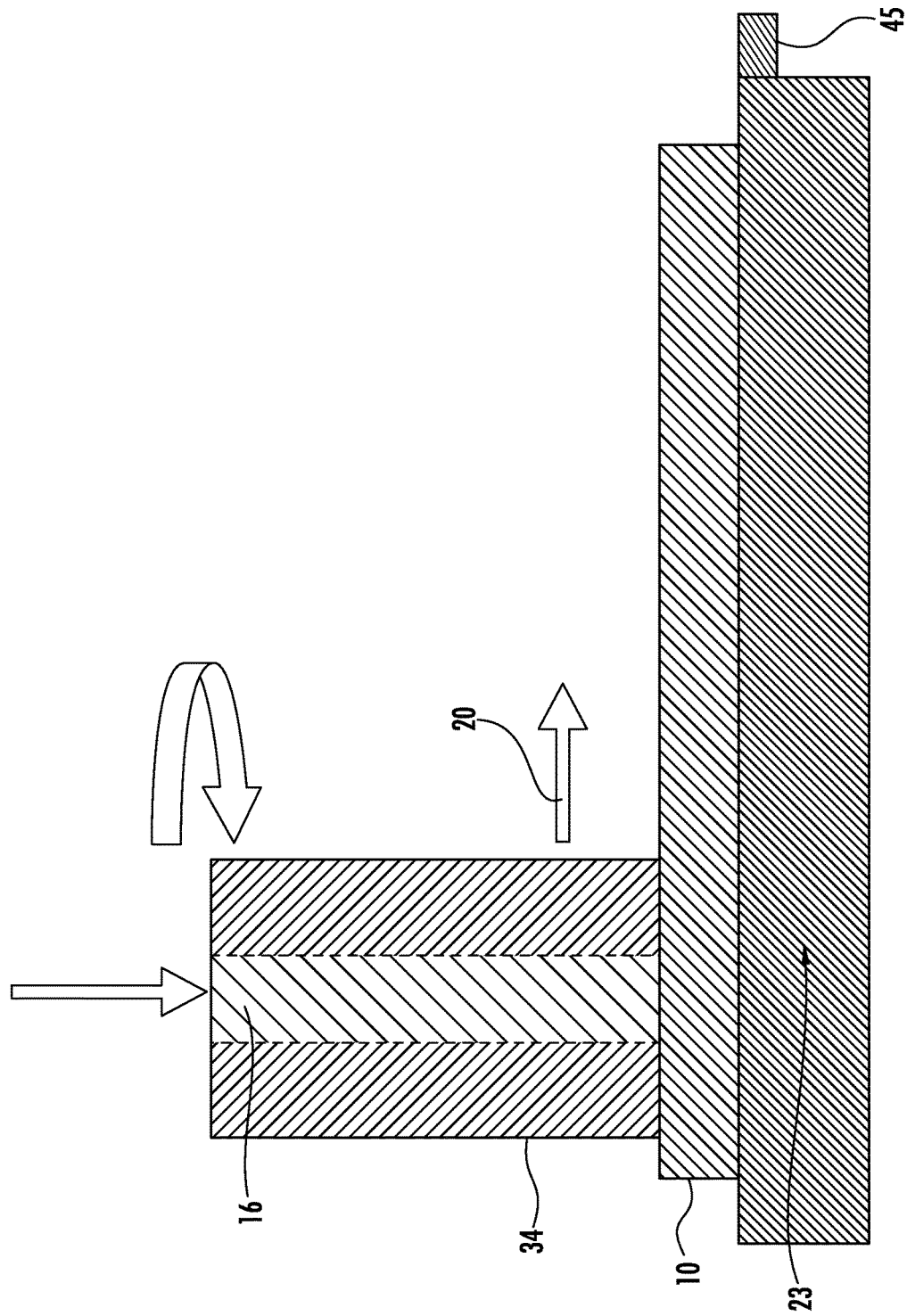
FIG. 2 is a schematic diagram showing a side cross-sectional view of the weld/joint configuration of FIG. 1 according to an embodiment of the invention.
Figure 3:
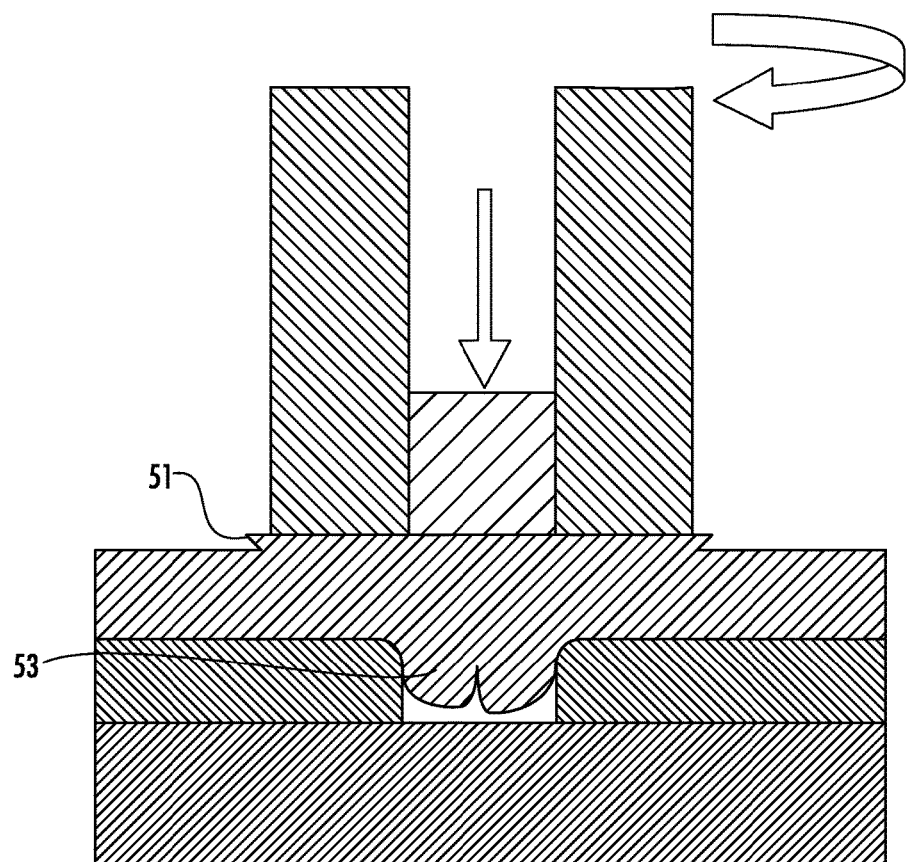
FIG. 3 is a schematic diagram showing a cross section of a welding/joining process during the joining of substrates according to an embodiment of the invention.

In embodiments of the present invention the required surface deformation is achieved by interaction of filler metal and tool, and additional bulk deformation is achieved during forming using the forming plate as shown in FIGS. 1-3. As shown, an additive friction stir method for joining substrates is provided, the method comprising: providing first and second substrates (10A and 10B) to be joined; providing a forming plate 23 comprising one or more forming cavities 19; placing the first and second substrates in communication with the forming plate; placing the first and second substrates in communication with each other (at joint line 11); rotating and translating an additive friction-stir tool relative to the substrates; feeding a filler material 16 through the additive friction-stir tool 34; deforming the filler material and the first and second substrates; and extruding 53 one or more of the filler material and the first and second substrates into one or more of the forming cavities of the forming plate.

FIGS. 1-3 describe embodiments of a method of joining metallic materials with rib formation at the root for butt joint type configurations. FIG. 1 and FIG. 2 show that the base metal 10, 10A, and 10B is placed and firmly clamped onto the forming plate 23 without any lateral movement in such a way that joint line 11 is preferably disposed above the middle of forming groove 19. At this stage, a rotating cylindrical tool 34 (e.g., a non-consumable tool) with filler 16 interacts with the base metal 10, 10A, 10B along joint line 11 and generates frictional heat. Although the rotating tool 34 can be used to penetrate the substrate 10, 10A, 10B, in preferred embodiments the rotating tool does not penetrate the base metal 10, 10A, 10B during translation. Likewise, although the tool can comprise a pin on the axis of rotation of the tool, in preferred embodiments, the tool 34 has no such pin. The tool can have geometry on the shoulder of the tool such as projecting or profiled features capable of stirring any deformed metal, but in embodiments it is preferred that the face of the shoulder is flat.

Reference numeral 20 shows the direction of tool 34 traverse in FIGS. 1 and 2. While the heat is being generated the filler metal 16 is fed through the tool 34 which generates additional heat and pressure. During the interaction of filler 16 and the rotating tool 34 with the base metal surface 10, 10A, 10B, heat and deformation required for solid state bonding between filler 16 and base metal 10, 10A, 10B is obtained at the surface. Upon further increase in contact pressure, due to the filler feeding, the base metal 10, 10A, 10B starts flowing into the grooves 19 in the forming plate 23, as shown in FIG. 3. During this stage the initial butting surface is eliminated.

FIG. 3 shows face reinforcement 51 as well as root formation 53 of base metal in the forming groove during joining. It is shown in such a way that the formation has not completely filled the forming groove. However, the geometry of the forming groove can be modified in order to control the shape and size of the root formation and filler feed rate can be adjusted in such way that the forming groove 19 is completely filled. In other embodiments the forming groove 19 is minimally filled, or a minimal void or forming groove is provided by the forming plate. The reinforcement/face formation of the weld is controlled by the filler feed rate and/or the tool position.

The hot base metal is protected from ambient atmosphere by the tool and additional shielding can be provided through additional forming grooves which are optional. The position of the shielding gas tube 45 beneath the base plate is shown in the embodiment in FIGS. 1 and 2, and it is placed ahead of the tool below the base plate in such a way that the shielding gas flows through the groove in the forming plate continuously without any interruption until the base metal is joined. The shielding gas protects the hot base metal from the ambient atmosphere and minimizes reaction with the forming plate.

Figure 4:
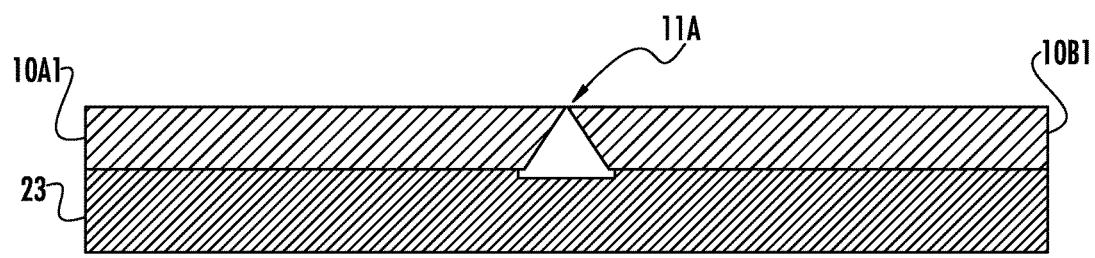
FIG. 4 is a schematic diagram showing a set up for joining materials 10A1 and 10B1 (without or with ribs) where a face of each of the substrates is machined and then the substrates are aligned and abutted against one another at the machined faces to form an inverted "V" groove shape at joint line 11A.

FIG. 4 shows an embodiment of a butt joint configuration and edge preparation of the base metal 10A1, 10B1 for joining metallic materials without/with minimal rib. In this case the forming plate 23 determines the minimal groove depth. In this configuration during the deformation stage the inclined surfaces of the inverted "V" groove disposed below joint line 11A are deformed to make a flat surface while achieving required deformation and temperature at the joint interface. Additionally, filler material can also be added to complete the joint. However, other butt joint configurations may fall within the methods of the invention, including a double "V", single "U", double "U", single "J", double "J", single bevel, or double bevel. These and other joint configurations are published in "The Everyday Pocket Handbook on Welding Joint Details for Structural Applications", published by the American Welding Society, Copyright 2004, incorporated by reference herein in its entirety.

The interaction of the tool with the base metal removes the oxide layer or any other form of contamination on the surface before the base metal interacts with the filler metal. The filler metal interacts with the contamination free surface of the base metal and metallurgically bonds with the base metal while the applied pressure on the filler metal deforms the base metal into the forming plate. During this process any un-bonded interface between the initial butt surfaces is moved to the forming plate when the material is being added on the top surface. If any un-bonded surface exists in the root of the weld, it can be optionally machined.

FIGS. 5A and 5B schematically show embodiments of the welded plates with and without rib formation along the weld line. FIG. 5A shows face reinforcement 51 where additional filler material is built up on the surface of the substrates joined using the process. FIG. 5A also shows ribs structure 53A on the root. FIG. 5B shows an area of root reinforcement 53B with no rib structure (or minimal root structure).

Figure 6A:
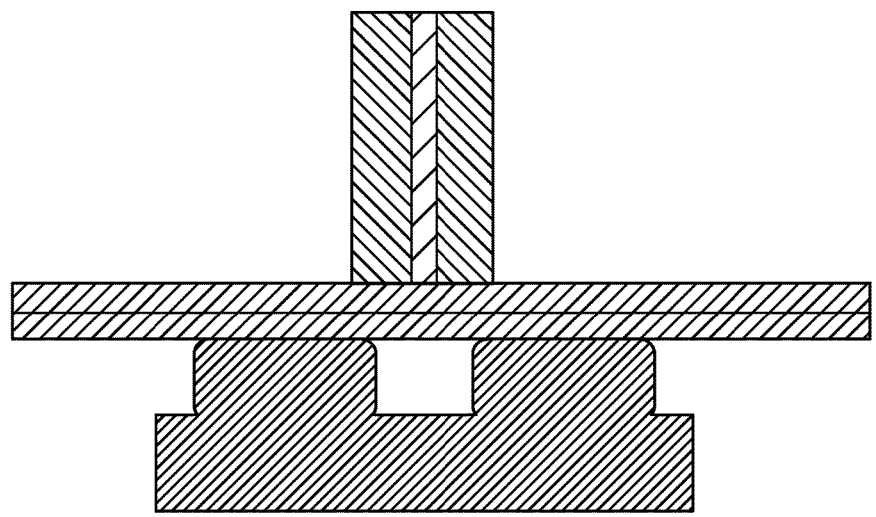
FIG. 6A is a schematic diagram showing a set up for a method of performing a lap joint configuration according to an embodiment of the invention.
Figure 6B:
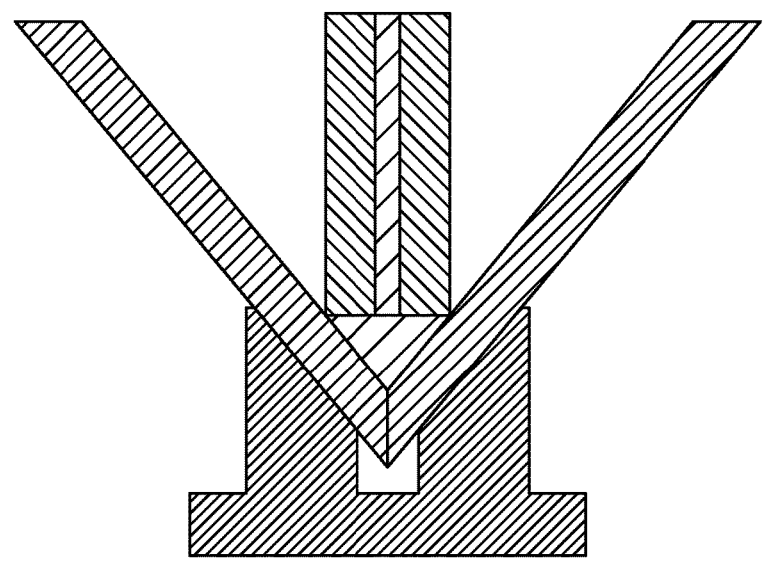
FIG. 6B is a schematic diagram showing a set up for a method of performing a V-shaped corner joint configuration according to an embodiment.

FIGS. 6A and 6B show various embodiments of forming plate design for lap joint and corner joint configurations, respectively. A method of preparing a lap joint can include a set up (shown in FIG. 6A) wherein the first substrate comprises a first face in communication with the forming plate; the first substrate comprises a second face disposed in a direction opposite the first face of the first substrate; the second substrate comprises a first face in communication with the second face of the first substrate such that the first substrate is sandwiched between the forming plate and the second substrate to provide for a lap joint between the first and second substrates; the second substrate comprises a second face disposed in a direction opposite the first face of the second substrate; the filler material is deposited on the second face of the second substrate and the deforming of the filler material and the first and second substrates creates the lap joint. The interaction of the filler material with the first and/or second substrates generates plastic deformation of and causes welding of the first and second substrates along the lap joint.

As shown in FIG. 6B, a method of preparing a corner joint can comprise providing first and second substrates to be joined; providing a forming plate comprising one or more forming cavities; placing the first and second substrates in communication with the forming plate; placing the first and second substrates in communication with each other to provide for a corner joint between the first and second substrates; rotating and translating an additive friction-stir tool relative to the substrates; feeding a filler material through the additive friction-stir tool; and deforming the filler material and the first and second substrates to create the corner joint. As illustrated, the first and second substrates can each comprise a first face with a slanted surface; the first face of the first substrate is in communication with the first face of the second substrate to provide for a corner joint between the first and second substrates; the first and second substrates each comprise a second face in communication with the forming plate; the filler material is deposited on a third face of each of the first and second substrates, which third face is disposed in a direction opposite the second face; and the filler material reinforces the corner joint at a concave portion of the corner joint along the third face of the first and second substrates.

The forming plate design and base metal edge preparation can be customized to fit the required joint configurations in achieving required temperature, pressure and deformation continuously along the joint line. Further, other joint configurations may fall within the scope of the methods of the invention, including Tee-joint, flange, flare, mechanical weld, angular weld, edge weld, and the like. Such joint configurations are readily understood by a skilled artisan.

In one embodiment, the forming plates are provided as a metal with a higher density, higher melting temperature, and/or increased hardness than the first and second substrate. This is to minimize the reaction of the forming plates with the first and second substrate. Additionally, the substrate plates may be provided by depositing filler material by the additive friction stir process to form a substrate in situ. The structure formed may or may not include a rib. Where a rib is formed, there is no limit to the length of the rib due to the addition of material from the stirring tool.

Various combinations of materials may serve as the filler material, or the first and second substrate. Suitable materials include using the same materials for each, or one or more material can have a difference in melting temperature, density, and/or hardness of up to about 50% of the other material(s), such as from 2-20%, including at least about 10%. In one embodiment, materials that have a higher melting temperature or that are denser or harder serve as the first substrate, and materials that have a lower melting temperature or are less dense or lighter serve as the filler material and/or second substrate.

Materials that may serve as the filler material or as the first and second substrate may include metals and metallic materials, polymers and polymeric materials, ceramic and other reinforced materials, as well as combinations of these materials. In embodiments, the filler material may be of a similar or dissimilar material as that of the first substrate and/or second substrate materials. The filler material and the first and second substrate may include polymeric material or metallic material, and without limitation include metal-metal combinations, metal matrix composites, polymers, polymer matrix composites, polymer-polymer combinations, metal-polymer combinations, metal-ceramic combinations, and polymer-ceramic combinations.

In one particular embodiment, the first and second substrates and/or the filler material are metal or metallic. The filer material, or the first substrate and second substrate may be independently selected from any metal, including for example Al, Ni, Cr, Cu, Co, Au, Ag, Mg, Cd, Pb, Pt, Ti, Zn, or Fe, Nb, Ta, Mo, W, or an alloy comprising one or more of these metals. In embodiments, the first and second substrates and/or the filler material are polymeric material. Non-limiting examples of polymeric materials useful as a filler material include polyolefins, polyesters, nylons, vinyls, polyvinyls, acrylics, polyacrylics, polycarbonates, polystyrenes, polyurethanes, and the like.

In still yet another embodiment, the filler material is a composite material comprising at least one metallic material and at least one polymeric material. In other embodiments, multiple material combinations may be used for producing a composite at the interface. The composite material is then extruded into a forming cavity of a forming plate disposed below the substrate.

In embodiments, the first substrate and second substrate may be provided as a sheet or plate, such as sheet metal or metallic plates, in a variety of dimensions for joining, including with a width and/or length of from about 1 inch to about 20 feet, such as for example 2'×2', 2'×3', 2'×4', 3'×4', 4'×4, 5'×5, 6'×4', and the like. The size of the sheets is highly dependent on and can fit any desired application. Depths of the substrates as described above may be on the order of micrometers to centimeters.

In these additive friction stir process embodiments, the filler material (for example, solid bar or powder) can be fed through the rotating additive friction stir tool where frictional and adiabatic heating occurs at the filler/substrate interface due to the rotational motion of the filler and the downward force applied. The frictional and adiabatic heating that occurs at the interface results in a severe plastic deformation at the tool-metal interface. As the tool moves along the substrate along a vector overlying the forming cavity or groove (or with any relative motion between the substrate and tool), the plasticized metal can be extruded under the rotating shoulder of the tool into the forming cavity or groove.

The filler materials can be in several forms, including but not limited to: 1) metal powder or rod of a single composition; 2) matrix metal and reinforcement powders can be mixed and used as feed material; or 3) a solid rod of matrix can be bored (e.g., to create a tube or other hollow cylinder type structure) and filled with reinforcement powder, or mixtures of metal matric composite and reinforcement material. In the latter, mixing of the matrix and reinforcement can occur further during the fabrication process. In embodiments, the filler material may be a solid metal rod. In one embodiment, the filler material is aluminum.

In embodiments, the filler material is joined with a substrate using frictional heating and compressive loading of the filler material against the substrate and a translation of the rotating friction tool. The filler material may be a consumable material, meaning as frictional heating and compressive loading are applied during the process, the filler material is consumed from its original form and is applied to the substrate. Such consumable materials can be in any form including powders, pellets, rods, and powdered-filled cylinders, to name a few. More particularly, as the applied load is increased, the filler material and substrate at the tool-substrate interface become malleable as a result of frictional and adiabatic heating and are caused to bond together under the compressive load. In one embodiment, the deformed metal is then extruded into the forming cavity to form a rib.

The rotating additive friction stir tool may take a variety of forms. For example, the tool can be configured as described in any of U.S. Published Application Nos. 2008/0041921, 2010/0285207, 2012/0009339, and 2012/0279441, 2012/0279442, as well as International Patent Application Publication No. WO2013/002869. Friction-based fabrication tooling for performing methods of the invention are preferably designed or configured to allow for a filler material to be fed through or otherwise disposed through an internal portion of a non-consumable member, which may be referred to as a throat, neck, center, interior, or through hole disposed through opposing ends of the tool. This region of the tool can be configured with a non-circular through-hole shape. Various interior geometries for the tooling are possible. With a non-circular geometry, the filler material is compelled or caused to rotate at the same angular velocity as the non-consumable portion of the tool due to normal forces being exerted by the tool at the surface of the tool throat against the feedstock. Such geometries may include a square through-hole and an elliptical through-hole as examples. In configurations where only tangential forces can be expected to be exerted on the surface of the filler material by the internal surface of the throat of the tool, the feed stock will not be caused to rotate at the same angular velocity as the tool. Such an embodiment may include a circular geometry for the cross-section of the tool in combination with detached or loosely attached feedstock, which would be expected to result in the filler material and tool rotating at different velocities. As used in this disclosure, the terms "additive friction-stir tool", "friction-stir tool", "non-consumable friction-stir tool", and "rotating non-consumable friction-stir tool" may be used interchangeably.

In embodiments the throat of the tool may be shaped with a non-circular cross-sectional shape. Further desired are tooling wherein the throat of the tool is shaped to exert normal forces on a solid, powder, or powder-filled tube type filler material disposed therein. Embodiments may also include features to ensure the frictional heating and compressive loading are of a degree sufficient to enable mixing of dispensed filler material with material of the substrate at a filler-substrate interface.

More specifically, the magnitude of force transferred from the rotating tool to the filler material is dependent on the coefficient of friction between the two. Thus, if the coefficient of friction is significantly low and the inertial force required to induce rotation of the filler material is significantly high, then the tool can rotate without inducing rotation (or with inducing rotation at a lower speed than the tool) in the cylindrical filler material. Under some circumstances during operation, differences in rotational velocity between the tool and the filler within the tool can lead to some filler material being deposited inside the tool, an accumulation of which can be problematic. Having the specific interior tool geometries described in this disclosure can reduce this issue, such as appropriately sized square-square or elliptical-elliptical shaped filler-dispenser geometries. Another way of reducing the difference in rotational velocity between the tool and the filler material is to manufacture filler material rods to fit tightly within the throat of the tool, or to otherwise tightly pack the filler material into the throat of the tool.

Any shape of the cross section of the interior of the tool that is capable of exerting normal forces on a filler material within the tool can be used. The throat surface geometry and the filler material geometry can be configured to provide for engagement and disengagement of the tool and filler material, interlocking of the tool and feed material, attachment of the tool and feed material, whether temporary or permanent, or any configuration that allows for the filler material to dependently rotate with the tool.

The interior surface shape of the tool (the throat) and the corresponding shape of the filler material may not be critical and can be constructed in a manner suitable for a particular application. Shapes of these surfaces can include, but are by no means limited to, square, rectangular, elliptical, oval, triangular, or typically any non-circular polygon. Additional shapes may include more distinctive shapes such as a star, daisy, key and key-hole, diamond, to name a few. Indeed, the shape of the outside surface of the filler material need not be the same type of shape as the surface of the throat of the tool. For example, there may be advantages from having a filler material rod with a square cross-section for insertion into a tool throat having a rectangular cross-section, or vice-versa where a filler material rod having a rectangular cross-section could be placed within a tool throat having a square cross-section in which the corners of the filler material rod could contact the sides of the square throat instead of sides contacting sides. Particular applications may call for more or less forces to be exerted on the filler material within the throat during operation of the tool. With concentric shapes and very close tolerance between the filler material and the tool certain advantages may be realized. Additionally, different shapes may be more suitable for different applications or may be highly desired due to their ease of manufacturing both the interior of the tool and corresponding filler material rods. One of ordinary skill in the art, with the benefit of this disclosure, would know the appropriate shapes to use for a particular application.

Additional embodiments of additive friction stir tools according to the invention can include a tool with a throat, where the filler material and throat are operably configured to provide for continuous feeding of the filler material through the throat of the stirring tool. In embodiments, the filler material is a powder, the throat of the tool is a hollow cylinder, and an auger shaped member disposed within the throat of the tool is used to force powder material through the throat of the tool onto the substrate. The filler material can be delivered by pulling or pushing the filler material through the throat of the stirring tool.

Additional embodiments can comprise an additive friction stir tool comprising: a non-consumable body formed from material capable of resisting deformation when subject to frictional heating and compressive loading; a throat with an internal shape defining a passageway lengthwise through the non-consumable body; an auger disposed within the tool throat with means for rotating the auger at a different velocity than the tool and for pushing powdered filler material through the tool throat; whereby the non-consumable body is operably configured for imposing frictional and adiabatic heating and compressive loading of the filler material against a substrate resulting in plasticizing of the filler material and substrate.

In embodiments, the tool and auger preferably rotate relative to the substrate. In further embodiments, the tool and auger rotate relative to one another, i.e., there is a difference in rotational velocity between the auger and the tool body. There may be some relative rotation between the filler material and the substrate, tool, or auger. The filler material and tool are preferably not attached to one another to allow for continuous or semi-continuous feeding or deposition of the filler material through the throat of the tool.

For example, the filler material to be joined with the substrate may be applied to the substrate surface using a "push" method, where a rotating-plunging tool, e.g., auger, pushes the filler material through the rotating tool, such as a spindle. Feed material can be introduced to the tool in various ways, including by providing an infinite amount of filler material into the tool body from a refillable container in operable communication with the tool.

In embodiments, the filler material is a powdered solid and is fed through the tool body using an auger shaped plunging tool (e.g., a threaded member). In such an embodiment, the plunging tool may or may not be designed to move or "plunge" in a direction toward the substrate. For example, the threaded configuration of the auger itself is capable of providing sufficient force on the powdered feed material to direct the filler material toward the substrate for deposition, without needing vertical movement of the auger relative to the tool.

As the spindle and plunging tool rotate, compressive loading and frictional heating of the filler material can be performed by pressing the filler material into the substrate surface with the downward force (force toward substrate) and rotating speed of the additive friction stir tool.

During the metal joining process, it is preferred that the spindle rotate at a slightly slower rate than the auger. Alternatively, in embodiments, the spindle can also be caused to rotate faster than the auger. What is important in embodiments is that there is relative rotation between the spindle and the auger during application of the filler material. Due to the difference in rotational velocities, the threaded portion of the auger provides means for pushing the filler material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it may be desired in some applications to alter the rotational velocity of the tool body and/or auger during deposition of the filler material.

Deposition rate of the filler material on the substrate can be adjusted by varying parameters such as the difference in rotational velocity between the auger screw and the spindle, or modifying the pitch of the threads on the auger. If desired, for particular applications it may be warranted to control filler material temperature inside or outside of the tool body. Such thermally induced softening of the filler material provides means to increase the rate of application of the material.

In the context of this specification, the terms "filler material," "consumable material," "consumable filler material", "feed material," "feedstock" and the like may be used interchangeably to refer to the material that is applied to the substrate from the additive friction fabrication tooling. In an embodiment, a powder filler material is used in combination with an auger disposed in the tool throat for applying a constant displacement to the filler material within the throat.

The filler material (for example, powder or solid feedstock) can be fed through the rotating spindle where frictional heating occurs at the filler/substrate interface due to the rotational motion of the filler and the downward force applied. The frictional and adiabatic heating that occurs at the interface acts to plastically deform the substrate and filler material at the interface resulting in a metallurgical bond between the substrate and filler.

Figure 7:
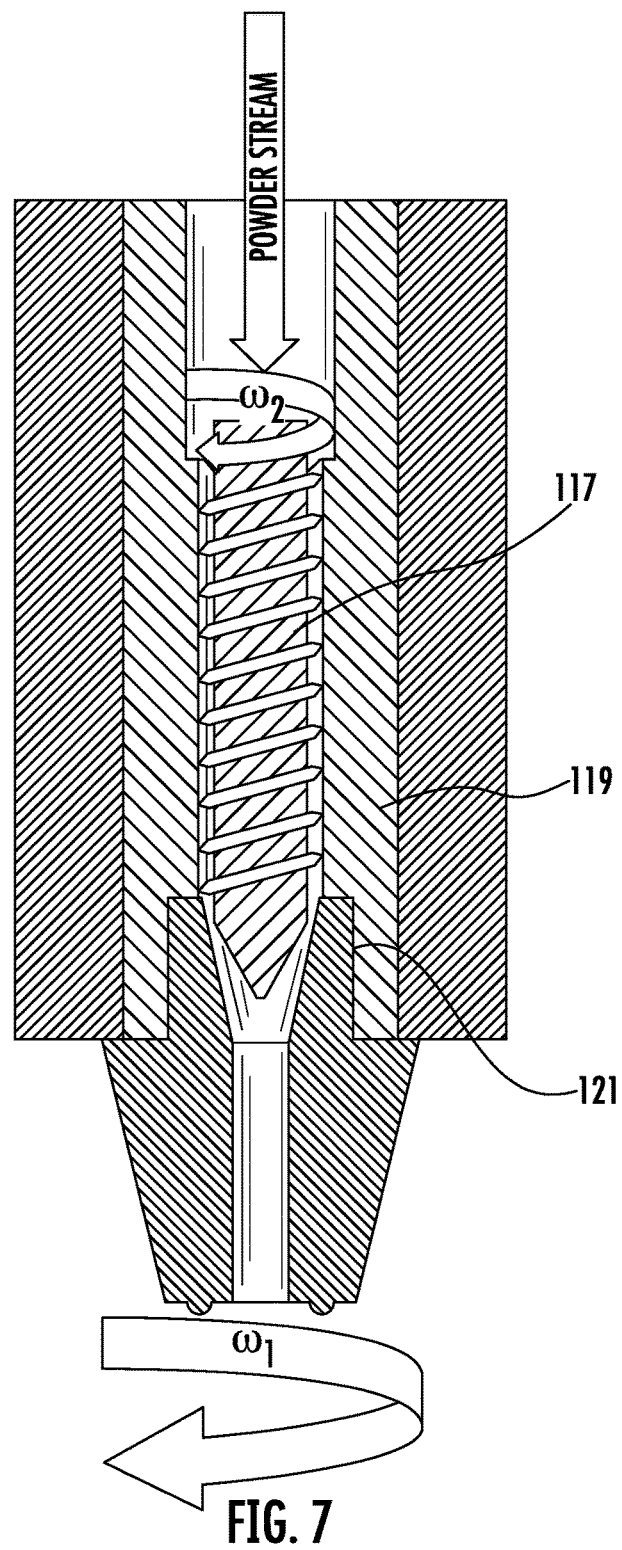
FIG. 7 is a schematic diagram showing a friction-stir tool with a continuous feeding system for the filler material that can be used in methods of the invention.

A mechanism as shown in FIG. 7 was conceived to feed powder into the spindle and force it out of the spindle while ensuring the filler is keyed into the spindle. This system utilizes an auger screw 117 to force powder through the spindle at a defined rate, which is one means capable of accomplishing this purpose. Additional methods of feeding solid stock keyed into the orientation of the spindle and rotating at the exact rate of the spindle are conceivable. For example, force can be applied to the filler material using a metal rolling mill type mechanism which is rotating with the spindle.

In such an embodiment, the spindle is spinning at a desired rotational velocity and the auger screw is driven at a different rotational speed in the same rotational direction which acts to force material out of the spindle. As shown in FIG. 7, the angular rotational speed or velocity of the friction stir tool is identified as $\omega 1$ and the angular rotational velocity of the auger is identified as $\omega 2$. In the context of this specification, the terms "rotational speed," "rotational velocity," "angular speed," and "angular velocity" can be used interchangeably and refer to the angular velocity of a component of the tool during use. The auger screw can rotate at a slower speed than the spindle, or in preferred embodiments the auger screw can rotate faster than the spindle. What is important is that there is relative rotation between the spindle and auger to cause filler material to be forced through the throat of the tool.

The pitch of the threaded auger screw and the volumetric pitch rate of the screw will affect the deposition rate under certain circumstances, and can be modified to accomplish particular goals. It is within the skill of the art to modify the pitch of the threads on the auger to obtain a certain desired result. The terms "tool," "friction stir tool," "spindle," "tool body," and the like as used in this specification may be used to refer to the outer portion of the tool body, which comprises a passageway lengthwise through the tool for holding and dispensing feed material through the tool. This passageway, or throat, is generally the shape of a hollow cylinder. The hollow cylinder can be configured to have a wider opening at the top of the tool for accommodating the auger and powder material and a smaller opening at the base of the tool where the feed material is dispensed from the tool. Thus, the shape of the throat of the tool need not be consistent throughout the length of the tool throat and can be configured to converge from one lengthwise end of the tool to the other. As shown in FIG. 7, the throat of the tool can comprise a first region which is the shape of a hollow cylinder of a first diameter. This region can transition into a second region which is the shape of a hollow cylinder of a second smaller diameter. The transition region can be a converging hollow cylinder or funnel shaped region to allow the first and second region to be connected seamlessly.

Disposed within the tool body is an auger 117. In the context of this specification, the terms "auger," "screw," and "plunger" may be used to refer to a component of the tool that is disposed within the tool throat for pushing or pulling material through the throat. Also within this specification, the auger can be considered a component of the friction stir tool body. The auger can have the general shape of a screw with threads, as shown in FIG. 7, or can be shaped in a spiral configuration similar to a spring. When disposed within the tool throat, there may be clearance between the auger 117 and the inside surface of the tool throat to allow for the passage of feed material between the auger and the throat. The inside of the surface of the tool throat includes sleeve 119 and bore 121. In other embodiments, there is only enough space to allow for rotation of the auger without interference from the surface of the throat. Preferably, the auger and tool body or spindle are not attached to one another. Each is operably connected with means for rotating and translating the components relative to a substrate surface, such that the auger and tool can rotate at different speeds but translate relative to the substrate at the same speed. It is preferred to keep the auger disposed within the tool throat in a manner such that there is no relative translational movement between the auger and tool body.

Powdered materials can be fed into the top of the spindle using a fluidized powder delivery system. Any type of powder delivery system can be used in connection with the tools and systems of the present invention. For example, a gravity-fed powder feeder system can be used, such as a hopper. One such feed system is the Palmer P-Series Volumetric Powder Feeder from Palmer Manufacturing of Springfield Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder filler material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

In embodiments, a mix of powder types can be added to the hopper which is operably connected with the stir tool. Alternatively, several different types of powder can be added individually to the hopper, then mixed within the hopper and dispensed as a mixture to the friction stir tool during use. For example a metal powder and ceramic powder could be fed into the spindle at the same time, from the same or separate hoppers, and upon consolidation/deposition the filler would be a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. Titanium aluminides such as TiAl and nickel aluminides such as $Ni_3Al$ may be provided as the discontinuous phase. The metal matrix may typically comprise Al, Cu, Ni, Mg, Ti, Fe and the like.

EXAMPLE

Figure 8A:
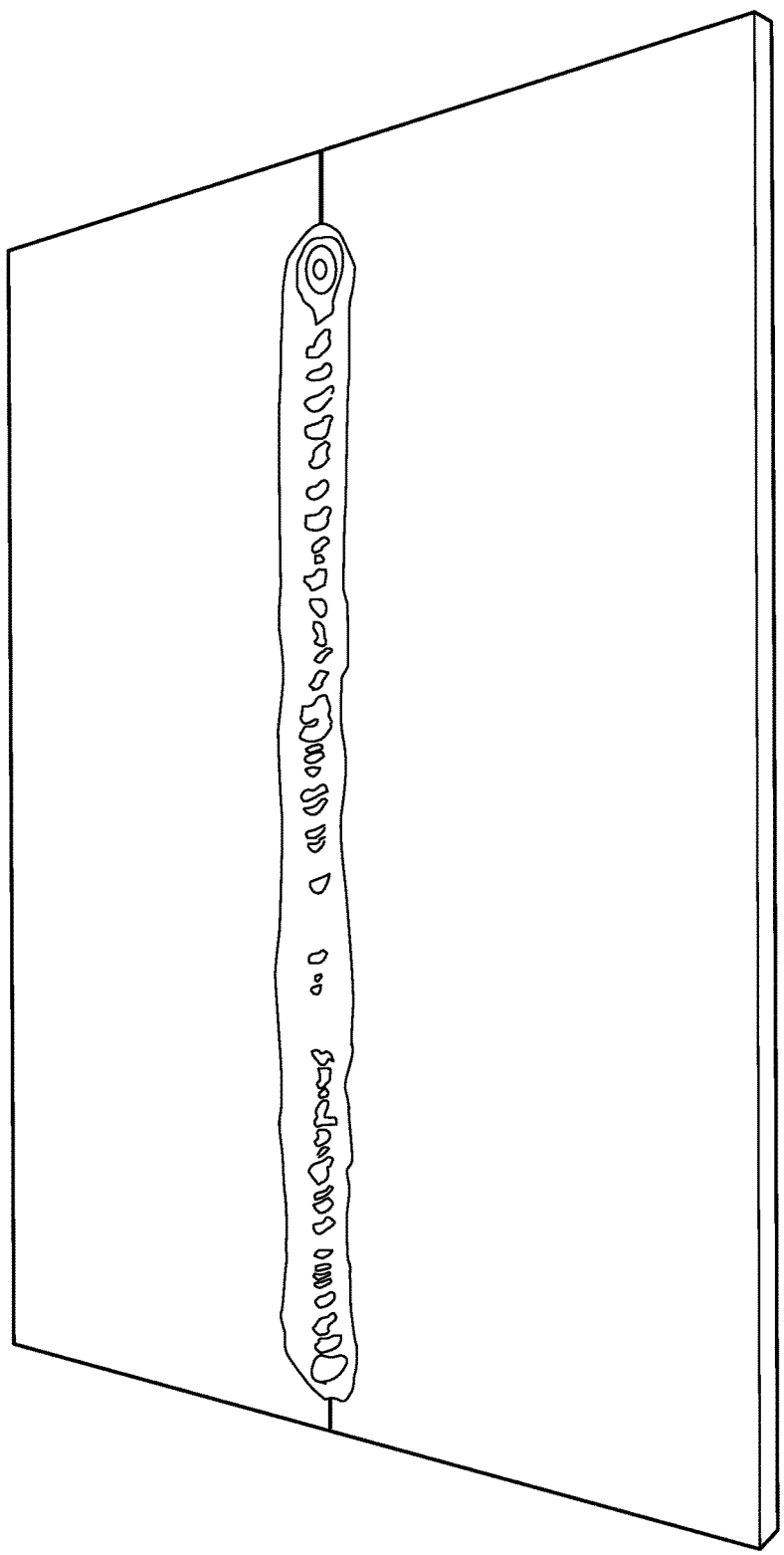
Figure 9:
FIG. 9 is a diagram of a cross section of the weld shown in FIGS. 8A-B.

Diagrams showing substrates joined using an embodiment of the additive friction stir methods of the invention are provided in FIGS. 8A-B, and 9. In particular, two HY-80 steel substrates were welded together with a filler material comprising HY-80. HY-80 steel is an alloy comprising several metals. Typically, HY-80 steel comprises on a percent by weight basis about 93-97% Iron (Fe), about 2-4% Nickel (Ni), about 1-2% Chromium (Cr), ≤ about 0.25% Copper (Cu), about 0.2-0.6% Molybdenum (Mo), about 0.15-0.35% Silicon (Si), about 0.12-0.18% Carbon (C), about 0.1-0.4% Manganese (Mn), ≤ about 0.025% Phosphorous (P), ≤ about 0.025% Sulfur (S), ≤ about 0.020% Titanium (Ti), and ≤ about 0.030% Vanadium (V). The density of HY-80 steel is typically about 7.87 g/cc and the melting point is around 1424° C. FIG. 8A shows one side of the substrates joined and FIG. 8B shows the other side of the substrates facing in an opposing direction. As illustrated, the deposited filler material can be seen on the face of the substrates at the face side of the weld where the rotating tool impressions are visible across the surface of the substrates in the filler material deposited on the substrates. Likewise, on the root side of the weld, the deposited filler material is visible as a minimal root projecting from the opposite side of the substrates. FIG. 9 provides a diagram of a cross section of the weld shown in FIGS. 8A-B. As illustrated, FIG. 9 demonstrates that a full penetration joint can be achieved. For convenience, some of the various regions of the weld are labeled, including a thermo-mechanically affected zone (TMAZ), a heat affected zone (HAZ), and a stirred zone (SZ).

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An additive friction stir method for joining substrates, the method comprising:
   providing first and second substrates to be joined;
   providing a forming plate comprising one or more forming cavities;
   placing one or both of the first and second substrates in communication with the forming plate;
   placing the first substrate and the second substrate facing one another;
   rotating and translating an additive friction-stir tool relative to a first face of one or both of the first and second substrates, which additive friction-stir tool comprises a throat with an opening for dispensing filler material;
   feeding a filler material through the throat of the additive friction-stir tool and dispensing the filler material through the throat opening;
   deforming the filler material and the first and second substrates; and
   extruding one or more of the filler material and the first and second substrates into one or more of the forming cavities of the forming plate;
   wherein during the rotating, translating, and extruding the opening of the throat of the additive friction-stir tool does not penetrate the first face of the first or second substrates.

2. The method of claim 1, wherein the first and second substrates are a sheet of metal or a metal plate.

3. The method of claim 1, wherein the first and/or second substrates and/or the filler material are independently chosen from metals, metallic materials, metal matrix composites (MMCs), polymers, polymeric materials, ceramics, ceramic materials, steel, Al, Ni, Cr, Cu, Co, Au, Ag, Mg, Cd, Pb, Pt, Ti, Zn, Fe, Nb, Ta, Mo, W, or an alloy comprising one or more of these metals, as well as combinations of any of these materials.

4. The method of claim 1, wherein the filler material is provided as a powder, pellet, rod, or powdered-filled cylinder.

5. The method of claim 1, wherein during rotating and translating the friction-stir tool does not penetrate the first and second substrates.

6. The method of claim 1, wherein the friction-stir tool has no pin centrally disposed on a shoulder of the tool.

7. The method of claim 1, further comprising applying a shielding gas through the forming cavity during the translating of the friction-stir tool.

8. The method of claim 1, wherein joining of the first and second substrates along a joint is caused by frictional heating and compressive loading of the filler material against one or both of the first and second substrates.

9. The method of claim 8, wherein the filler material is included in the joint.

10. The method of claim 2, wherein the first and second substrates are in communication with each other along one face of each substrate.

11. The method of claim 10, wherein the first and second substrates are in communication with each other to provide for a butt joint, a lap joint, a corner joint, a Tee-joint, a flange, a flare, a mechanical weld, an angular weld, or an edge weld.

12. The method of claim 1, wherein a butt joint is prepared by:
 placing a second face of each of the first and second substrates facing each other to provide for a butt joint between the first and second substrates;
 placing a third face of each of the first and second substrates in communication with the forming plate;
 depositing the filler material from a direction that faces the first face of each of the first and second substrates.

13. The method of claim 12, wherein the second face of each of the first and second substrates is slanted and when abutted together form an inverted V-shaped groove.

14. The method of claim 1, wherein the extruding creates a rib in communication with one or both of the substrates.

15. The method of claim 1, wherein a lap joint is prepared by:
 positioning a second face of the first substrate in communication with the forming plate;
 positioning a second face of the second substrate in communication with a first face of the first substrate, such that the first substrate is disposed between the forming plate and the second substrate; and
 depositing the filler material from a direction that faces the first face of the second substrate.

16. The method of claim 1, wherein additional filler material is built up on the first face of one or both of the first and second substrates.

17. An additive friction stir method for joining substrates, the method comprising:
 providing first and second substrates to be joined;
 providing a forming plate comprising one or more forming cavities;
 placing one or both of the first and second substrates in communication with the forming plate;
 placing the first and second substrates facing each other;
 rotating and translating an additive friction-stir tool relative to one or both of the substrates;
 feeding a filler material through an opening of the additive friction-stir tool while rotating the filler material, pressing the filler material into one or both of the first and second substrates without the opening of the additive friction-stir tool penetrating the first and second substrates;
 while rotating the filler material, pressing the filler material into one or both of the first and second substrates with sufficient pressure to frictionally heat and deform one or both of the first and second substrates with the filler material; and
 extruding one or more of the filler material and the first and second substrates into one or more of the forming cavities of the forming plate.

18. The method of claim 17, wherein the first and/or second substrates and/or the filler material are independently chosen from metals, metallic materials, metal matrix composites (MMCs), polymers, polymeric materials, ceramics, ceramic materials, steel, Al, Ni, Cr, Cu, Co, Au, Ag, Mg, Cd, Pb, Pt, Ti, Zn, Fe, Nb, Ta, Mo, W, or an alloy comprising one or more of these metals, as well as combinations of any of these materials.

19. The method of claim 17, wherein the filler material is provided as a powder, pellet, rod, or powdered-filled cylinder.

20. The method of claim 17, wherein the first and second substrates are in communication with each other along one face of each substrate.

21. The method of claim 17, wherein the first and second substrates are in communication with each other to provide for a butt joint, a lap joint, a corner joint, a Tee-joint, a flange, a flare, a mechanical weld, an angular weld, or an edge weld.

22. The method of claim 17, wherein the extruding creates a rib in communication with one or both of the substrates.

23. An additive friction stir method for joining substrates, the method comprising:
 providing first and second substrates to be joined;
 providing a forming plate comprising one or more forming cavities;
 placing one or both of the first and second substrates in communication with the forming plate;
 placing the first and second substrates facing one another;
 providing an additive friction-stir tool comprising a throat disposed on an axis of rotation of the tool, which throat comprises an opening for dispensing a filler material, and the tool comprises no pin through which the filler material is dispensed;
 rotating and translating the additive friction-stir tool relative to one or both of the first and second substrates;
 feeding the filler material through the throat of the additive friction-stir tool and dispensing the filler material through the throat opening;
 deforming the filler material and the first and second substrates; and
 extruding one or more of the filler material and the first and second substrates into one or more of the forming cavities of the forming plate.

24. The method of claim 23, wherein the feeding comprises feeding an amount of the filler material through the tool that is capable of filling one or more of the forming cavities.

25. The method of claim 1, wherein the first substrate comprises a first material and the second substrate comprises a second material that is different from the first material.

26. The method of claim 17, wherein the first substrate comprises a first material and the second substrate comprises a second material that is different from the first material.

27. The method of claim 23, wherein the first substrate comprises a first material and the second substrate comprises a second material that is different from the first material.

\* \* \* \* \*